Nov. 17, 1959 H. W. KAUFMANN 2,913,593

HALF-ADDER FOR COMPUTERS

Filed April 15, 1954

2 Sheets-Sheet 1

INVENTOR
HENRY WILLIAM KAUFMANN

Efury Light

ATTORNEY

Nov. 17, 1959 H. W. KAUFMANN 2,913,593

HALF-ADDER FOR COMPUTERS

Filed April 15, 1954

2 Sheets-Sheet 2

INVENTOR
HENRY WILLIAM KAUFMANN

BY [signature]

ATTORNEY

United States Patent Office 2,913,593
Patented Nov. 17, 1959

2,913,593

HALF-ADDER FOR COMPUTERS

Henry William Kaufmann, Phoenixville, Pa., assignor to Sperry Rand Corporation, a corporation of Delaware Application April 15, 1954, Serial No. 423,422

19 Claims. (Cl. 307—88)

This invention relates to half-adders for computers. The function of a half-adder in a computer circuit is described on pages 270–272, 288 and 289 of the textbook "High Speed Computing Devices," by the staff of Engineering Research Associates Incorporated, and published by McGraw-Hill Book Company (1950).

It is the primary object of this invention to provide a half-adder that does not have any component parts that are liable to burn out.

Another object of this invention is to provide a simple half-adder that is not likely to become inoperative due to failure of one or more of the component parts thereof.

Yet another object of this invention is to provide a half-adder that is simple and exact.

Still another object of this invention is to provide a half-adder that is low in cost.

Another object of the invention is to provide a half-adder that is low in cost yet very efficient and effective in operation.

Another object of the invention is to provide a half-adder in which the component parts include magnetic amplifiers, whereby the advantage of that type of component is obtained.

Briefly speaking, the present invention involves amplifiers of the type which are well known in the art in combination with certain gating circuits and rectifiers, all arranged to provide a half-adding function. The details of one form of the invention will be described in the following specification, taken in conjunction with the accompanying drawings, in which.

Figure 1:
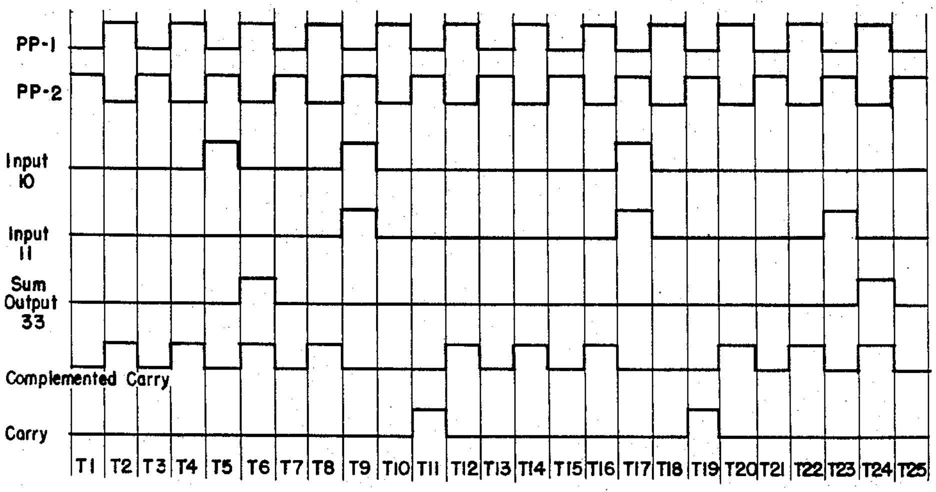
Figure 1 illustrates the wave forms of the signals at various points in the circuit.

As shown in Figure 1, there is a continuous series of power pulses PP–1 which occur at regular intervals without interruption. There is a second series of power pulses PP–2 which appear at regular intervals without interruption, but at the intervals between the power pulses PP–1. The input signals on terminals 10 and 11 are always timed to appear during the spaces between power pulses PP–1. These input signals control or set the magnetic amplifiers in such a way that the next power pulse is or is not allowed to pass. Therefore, the "sum" output 33 due to any particular input signal is always one time period later than the input signal creating such "sum" output. For example, in Figure 1, the signal on input 10 at time T5 produced the "sum" output at time T6. In accordance with the binary system of addition, whenever a signal appears on either input 10 or input 11, a "sum" output should appear except when signals appear on both inputs 10 and 11, in which event a "carry" output should appear. This application discloses two "carry" outputs either or both of which may be used as desired. One of these outputs has an output signal in which a pulse represents a digit to be carried. Hereinafter this is designated as the "carry" output. The other output produces a signal in which the absence of a pulse represents a digit to be carried. This is hereinafter referred to as the "complemented carry" output. However, so far as the claims are concerned, the term "carry output" is regarded as generic so it will cover either form of this type of output.

In response to a pulse on either input 10 or input 11, but not involving simultaneous pulses on both of those inputs, there will be a pulse in the "sum" output 33 in the time period immediately following the input signal. If input pulses simultaneously appear on both inputs 10 and 11, there will be no pulse in the "sum" output 33 during the next time interval but there will be the absence of a pulse in the "complemented carry" output C which will indicate that a digit is to be carried. During the next suceeding time interval, that is the time interval two spaces after signals are received on both inputs 10 and 11, there will be a pulse at the carry output 66.

The manner of producing the output signals described and shown in connection with Figure 1 will now be explained in connection with the block diagram of Figure 2. This block diagram shows a non-complementing amplifier A–NC. This amplifier does not produce an output pulse corresponding to a power pulse PP–1 except when its input was energized during the immediately preceding time interval. On the other hand, the complementing amplifier A–C1 has an output pulse corresponding to each power pulse PP–1 except during the time interval just following an input signal from gate G–2. Likewise, the complementing amplifier A–C2 has an output corresponding to each input power pulse PP–2 except when there was, during the immediately preceding time period, a pulse received from amplifier A–C1. The gate G–1 allows pulses to pass to the "sum" output 33 whenever gating pulses are received from amplifier A–C1. In the absence of gating pulses from that amplifier, the gate G–1 blocks all current flow to the "sum" output 33. Gate G–2 has an output only when both input terminals 10 and 11 are energized. If either one of these input terminals is energized alone, there will be no output from gate G–2.

If we now assume that power pulses PP–1 and PP–2 as well as input signals 10 and 11, all as shown in Figure 1, are applied to their proper input terminals of Figure 2, the result will be as follows. The power pulses PP–1 will pass through amplifier A–C1 until a signal is received from gate G–2. No signal will be received from gate G–2 until input pulses appear on both terminals 10 and 11. This does not occur until time period T9. Therefore, during time periods T2, T4, T6 and T8, there will be pulses in the output of amplifier A–C1 corresponding to pulses PP–1 of Figure 1. These respective power pulses will hold gate G–1 open. Therefore, gate G–1 will be held open during periods T2, T4, T6, and T8. If during one of these periods the amplifier A–NC has a pulse in its output, that output will flow through gate G–1 to the "sum" output 33. This can occur only immediately following the receipt of a signal on one of terminals 10 and 11. Therefore when the input pulse appeared on input 10 at time T5, the amplifier A–NC allowed the next power pulse PP–1 to pass through gate G–1 and appear at "sum" output 33. Therefore Figure 1 shows a pulse at the "sum" output 33 at the time period T6 which follows the input signal on input 10 by one space. At time period T9, pulses appeared on both inputs 10 and 11 which caused gate G–2 to transmit a pulse to amplifier A–C1 and thus stop flow of the next output pulse therefrom. Hence, as shown in Figure 1, there is no signal at time T10 on the "complemented carry" output. Likewise there is no gating pulse to gate G–1 and this gate therefore blocks the output from amplifier A–NC and there is no output pulse at 33. It follows therefore that at time T10 there is no pulse at the "sum" output 33 of Figure 1. The absence of a pulse at time period T10 allowed the next power pulse PP–2 to flow through amplifier A–C2 and produce a "carry" output pulse at time period T11. Hence, we may summarize the effect of receipt of input signal pulses on terminals 10 and 11 concurrently at time period T9. These two signals caused gate G–2 to interrupt the output of amplifier A–C1 and prevent appearance of a pulse in the "complemented carry" output during the time period T10. The absence of a pulse at time period T10 causes amplifier A–C2 to produce a pulse during the next succeeding time period T11. In other words, one time space following the appearance of pulses on both of the input terminals there is no "complemented carry" output. At two time spaces following the appearance of pulses on both inputs 10 and 11 there is a carry output. Figure 1 shows that input pulses were received on both inputs simultaneously at time period T17. The effect of these two input pulses is precisely the same as the effect of the two concurrent input pulses at time period T9, and therefore requires no further discussion. The next input signal appears on input 11 at time T23, when no input signal appears on input 10. This input signal sets amplifier A–NC so that the next power pulse PP–1 which occurs during time period T24 passes through gate G–1 to "sum" output 33. The gate G–1 is held open during this time period since gate G–2 had no output and therefore allowed amplifier A–C1 to provide triggering pulses for the gate G–1. Such a triggering pulse appears on the "complemented carry" output at time period T24. This latter pulse blocks amplifier A–C2 and hence there is no "carry" output at time T24. A study of the foregoing explanation of the block diagram will show that the device will perform the binary addition functions of a half-adder as described in the text abovementioned. However, it may be stated at this point that while the present invention performs the same addition functions that are described in the aforesaid text, the means for carrying out these functions are entirely different.

Figures 2, 4:
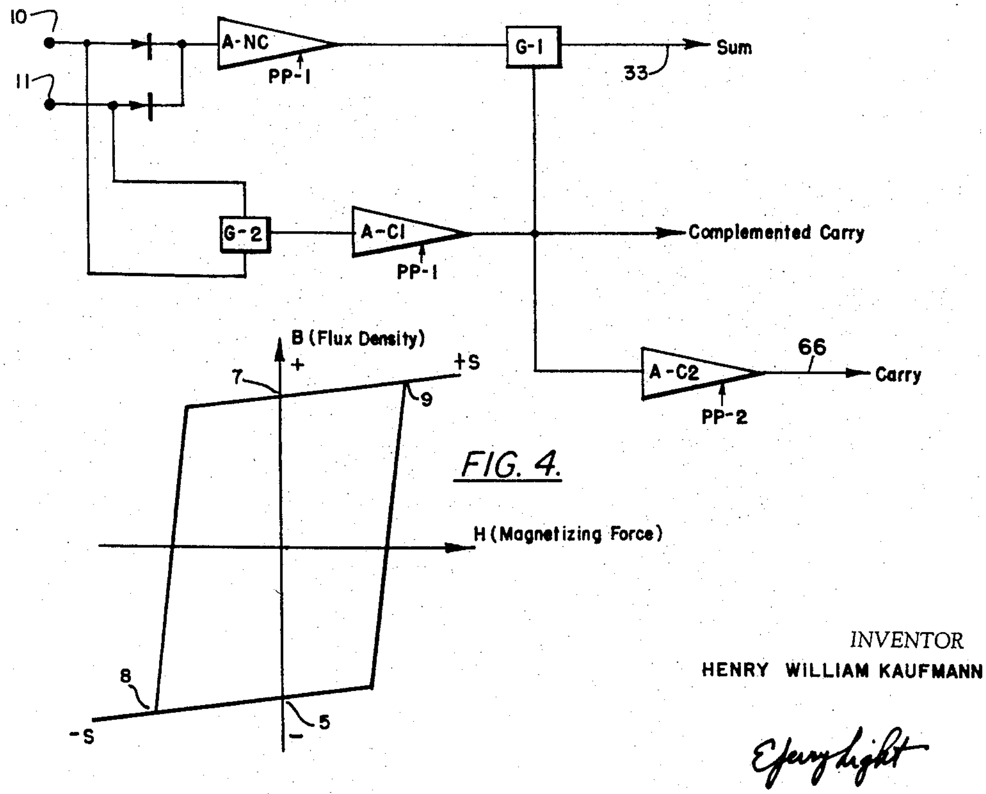
Figure 2 is a block diagram of the invention.
Figure 4 is a hysteresis loop of the magnetic cores involved in the combination.
Figure 3:
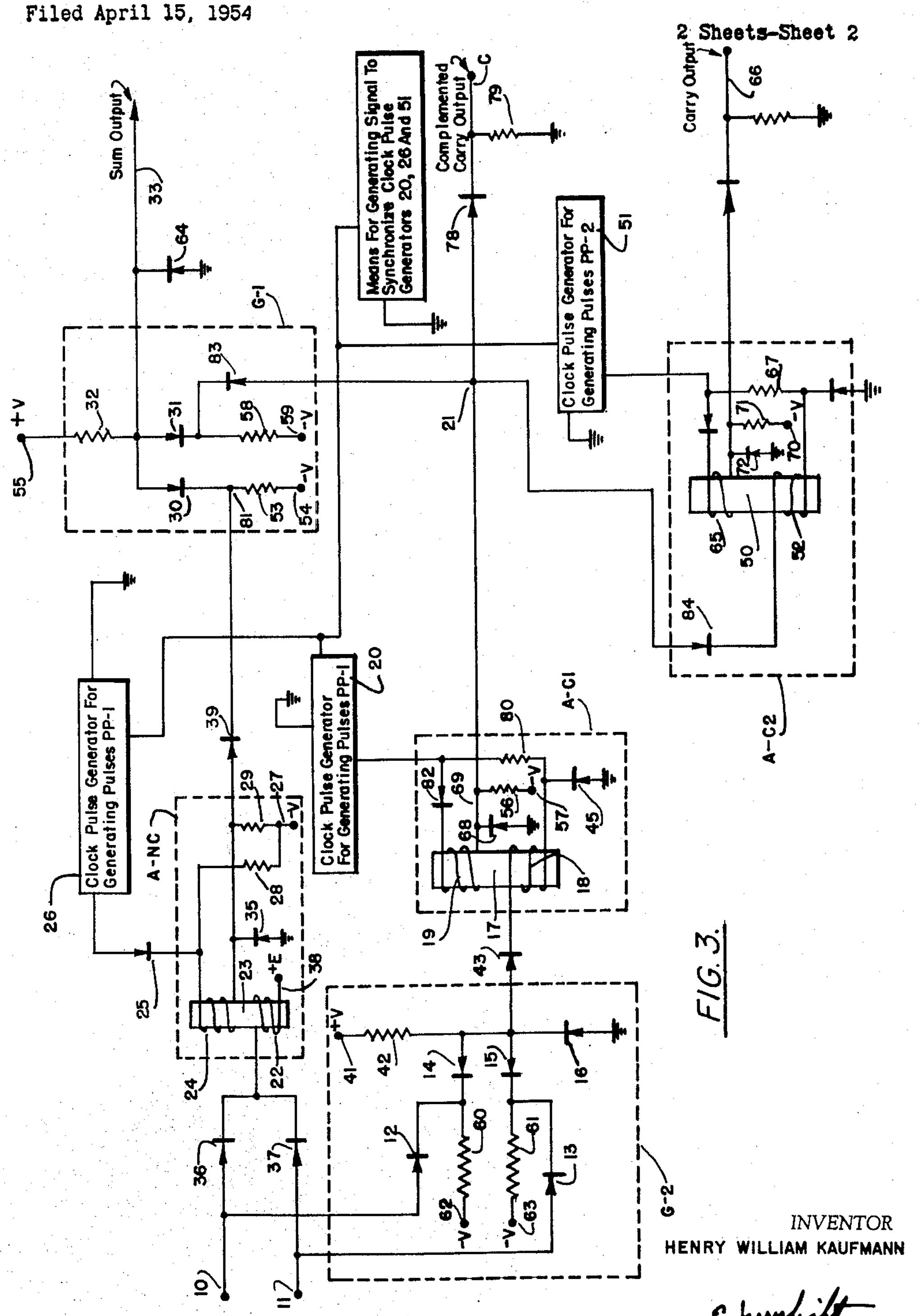
Figure 3 is a schematic diagram of the invention.

The construction and mode of operation of the device of Figure 2 is shown in more detail in connection with Figure 3. The three magnetic cores 17, 23 and 50 may be made of a variety of materials, among which are the various types of ferrites and the various types of magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 4). Cores of this character are now well known in the art. In addition to the wide variety of materials applicable, the core may be constructed in a number of geometries including both closed and open paths. For example, cup-shaped, strips, and toroidal-shaped cores are possible.

Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (unsaturated) portions of the hysteresis loop, the impedance of a coil on the core is high.

In Figure 3, assume that a power pulse PP–1 appears at the terminal 26 at time period T2 of Figure 1. This pulse, we will assume, appears at a time when the core is operating at point 5 on the hysteresis loop of Figure 4. This power pulse then flows through rectifier 25, coil 24, resistor 29 to terminal 27 which is connected to the negative pole of an electrical source, that is pole 27 has a potential lower than ground potenital. The flow of current through coil 24 magnetizes the core positively from point 5 to point 9 on the hysteresis loop of Figure 4. The pulse is of such limited time and amplitude that it does not tend to drive the hysteresis loop much closer to saturation than point 9. Therefore at the conclusion of the pulse, the magnetizing force will return to the zero value 7. At the conclusion of this power pulse, current will now flow through coil 24 in the reverse direction since terminal 27 is lower than ground potential. The path of this reverse current is, terminal 27, resistor 28, coil 24, rectifier 35, to ground. The potential of terminal 27 and the value of resistor 28 are so related to coil 24 that the reverse current will magnetize the core 23 in a negative direction to just a sufficient extent to increase the magnetization to point 8 on the hysteresis loop. In other words, the core is not driven to saturation in the negative direction. Following this reverse current, the magnetization returns to zero at point 5. The next power pulse PP–1 appearing at time T4 again drives the magnetization positively from point 5 to point 9, after which it returns to point 7. During the next time period T5 current again flows in the path: terminal 27, resistor 28, coil 24 and rectifier 35, to ground; but this reverse current does not tend to magnetize the core in the reverse direction as it did previously, because an input signal appeared at input 10 during time T5. This input signal passed through rectifier 36 and coil 22 to the positive side of the source of potential 38. Since this input signal created a magnetization in exactly the opposite sense of that due to the reverse flow in coil 24 during the same time interval, the two magnetizations canceled each other and consequently the magnetization of the core remained at point 7 on the hysteresis loop. Hence, the next succeeding power pulse, which appeared at time T6, passed from input terminal 26 through rectifier 25, coil 24, rectifier 39, resistor 53, to the negative pole of source of potential 54. Since the magnetization was at point 7 at the beginning of this power pulse, the core 23 was driven positively towards saturation at point +S. In other words, the core operated on the portion thereof 7 to +S, which is a relatively saturated portion. Therefore, the power pulse passed through coil 24 at a time when the core was substantially saturated. Hence, the coil 24 had low impedance during this particular power pulse and the pulse therefore passed through the coil 24 and rectifier 39 placing a high positive potential at the junction 81. This blocked flow of current that would otherwise pass from the positive terminal 55 through resistor 32, rectifier 30, resistor 53 to negative terminal 54.

It follows that current will normally flow from positive terminal 55 through rectifier 30 to negative terminal 54 at all times except during the time period immediately following a flow of signal current through winding 22. During time periods immediately following the flow of current through coil 22, flow of current to rectifier 30 is blocked because a high potential is applied to the cathode thereof. This high potential is due to the PP–1 pulse which has passed through coil 24 and rectifier 39.

Referring now to the magnetic amplifier A–C1, it is noted that power pulses PP–1 may readily flow as follows: pulse generator 20, diode 82, coil 19, resistor 56 to negative source of potential 57. Current will also flow through rectifier 83, resistor 58, and thence to negative pole 59. Hence in the absence of a current in coil 18 there will be a pulse at the "complemented carry" output C each time a power pulse PP–1 is applied to input terminal 20.

There is normally a current from the positive pole 55 through resistor 32, rectifier 31, resistor 58 to negative terminal 59. However, when a signal appears at point 21, due to power pulses PP–1 from generator 20, the potential at the cathode of rectifier 31 is raised to such a high positive value that no current flows through this rectifier. In case both rectifiers 30 and 31 have been rendered nonconducting by the application of positive potentials on the cathodes thereof, current then flows from the positive pole 55, resistor 32, to the "sum" output 33. In other words, if a power pulse passes through rectifier 39 from generator 26 at the same time that a power pulse passes from generator 20 to terminal 21 and through rectifier 83, flow of current through both rectifiers 30 and 31 will be blocked and current will flow from terminal 55 to the "sum" output 33, producing a potential pulse in that output. It is noted that parts 30, 31, 32, 33, 53, 54, 55, 58, 59 and 64, constitute a well known diode gate. Therefore no further extended explanation of the operation of those parts is necessary.

The circuit employs another diode gate utilizing parts 12, 13, 14, 15, 41, 42, 16, and 43. This gate is likewise well known in the art and requires no extensive explanation, but it is desirable to state that in the event there is no signal on input 10, the high potential on terminal 41 will cause current to flow through resistor 42, rectifier 14, resistor 60 and from thence to the negative potential pole 62. The flow of current through resistor 42 will so effectively lower the output potential at the anode of rectifier 43 that the potential at the input of rectifier 43 will tend to be negative and will therefore be brought to substantially ground potential by the rectifier 16. Likewise, if there is no signal on input terminal 11, a current will flow from positive terminal 41 through resistor 42, rectifier 15, resistor 61, to negative pole 63. Here again the heavy current through resistor 42 will tend to lower the potential at the anode of rectifier 43 to a negative value which will be brought to substantially ground potential by the rectifier 16. Hence, it is obvious that if either one of terminals 10 or 11 has no signal upon it, the potential at the input of rectifier 43 will be zero. On the other hand, if signals appear on both terminals 10 and 11, the potentials at the right-hand poles of both resistors 60 and 61 will be raised to substantial positive values in which case rectifiers 14 and 15 will not conduct. Therefore, current will flow from positive pole 41 to the anode of rectifier 43 through resistor 42, rectifier 43, coil 18, resistor 80, generator 20, to ground. In the absence of energization of coil 18, the power pulses from generator 20 readily pass through coil 19 because the core is operating in the relatively saturated part of the hysteresis loop, that is the portion between point 7 and +S. In the absence of a pulse in coil 18, each succeeding power pulse drives the core from point 7 to point +S and the core returns to point 7 during the period between pulses. However, if during the period between pulses, current flows through coil 18, the core is magnetized in a negative direction and driven from point 7 negatively to point 8. At the conclusion of this magnetizing force, the core returns to the zero magnetizing force, point 5. The next succeeding power pulse PP–1 drives the core through the unsaturated portion of the hysteresis loop from point 5 to point 9. Therefore the potential applied to the coil 19 encounters a high impedance and very little current flows through the coil, hence there is no output at point 21. It follows therefore that after each pulse of current through coil 18, the next power pulse PP–1 does not produce substantial output potential at point 21.

In view of the foregoing, we can summarize the operation of the above mentioned parts as follows. In the absence of a signal on terminals 10 and 11 there will be no flow of current through coil 22 of core 23. Hence power pulses PP–1 from terminal 26 will flow through coil 24 and resistor 29 flipping the core in one direction without saturation. During the intervals between power pulses PP–1 there will be a reverse current from terminal 27, resistor 28, coil 24, rectifier 35, to ground which will flip the core back to its original points on the hysteresis loop, again without saturation. Hence, so long as there is no output signal on coil 22 there will be no saturation of the core and hence no substantial flow of current through rectifier 39. Current will flow from terminal 55 through resistor 32, rectifier 30, resistor 53, to negative source 54 and therefore the potential on wire 33 will tend to be negative rather than positive. This potential is in effect grounded or reduced to zero by the rectifier 64. Hence, there will be no current in the "sum" output 33. During this time interval, however, there will be no current through rectifier 31 because the power pulses PP–1 will flow from terminal 20, coil 19, resistor 58 to negative source of supply 59, thus placing a positive potential at the top of resistor 58 and blocking current flow through rectifier 31. The latter situation will be maintained even if a pulse should appear on one of terminals 10 and 11 provided however it does not appear on both of those terminals. A signal appearing on just one of the terminals will not open the diode gate 12, 13, 14, 15, etc. and therefore no current will flow through coil 18. Hence, pulses will continue to flow from generator 20 to negative source 59. However, when a signal appears on one of the input terminals, either 10 or 11, current then does flow through coil 22, which as stated before, so sets the core that power pulses PP–1 now flow from generator 26 through coil 24, rectifier 39 to the negative source of potential 54. Hence, rectifier 30 will be blocked. As has been stated already, rectifier 31 is also blocked and therefore the current from positive pole 55 flows through resistor 32 to the "sum" output 33 and therefore a signal appears at this "sum" output.

In the event that signals appear on both input terminals 10 and 11, the diode gate 12, 13, 14, 15, etc. causes the current from positive pole 41 to flow through rectifier 43 and coil 18, as stated before. This greatly reduces further flow of current through coil 19, as stated previously, and causes therefore an absence of a signal at point 21 and therefore an absence of signal at the "complemented carry" output. As stated before, the absence of a signal at the "complemented carry" output indicates that there is a digit to be carried. In view of the absence of a signal at point 21, there is nothing to prevent current flow through rectifier 31, and therefore the current from positive pole 55 flows directly to negative pole 59 and there is no pulse at "sum" output 33. In the event it is desired to have a pulse which indicates the presence of a digit to be carried, rather than the absence of a pulse which appears at 21, an additional magnetic amplifier 50, etc. may be employed. The magnetic core 50 has a coil 65 through which power pulses PP–2 pass to the "carry" output 66, except during those periods when the core 50 is maintained in a saturated position between point 7 and +S by the repeated series of pulses from source 51 to terminal 66. However, if a signal appears at point 21, current flows through rectifier 84, coil 52, resistor 67, pulse generator 51, to ground. This flow of current in coil 52 magnetizes the core 50 negatively from point 7 to point 8 and at the conclusion of the flow of current in coil 52 the magnetizing force returns to the zero value 5. Hence, the next power pulse PP–2 which flows through coil 65 drives the core along an unsaturated portion from point 5 to point 9 and therefore that power pulse encounters very high impedance in the core 50. As a result there is no output at 66. In other words, the amplifier 51, 52, 65, 67, etc. is the equivalent of the amplifier 18, 19, 20, etc. in that both of them produce output signals in response to each power pulse except during the period following the energization of the lower coil on the core. It follows therefore that for each time interval in which there is no pulse at point 21, there will be a pulse at point 66 during the next time period. Hence, there is a power pulse at the "carry" output 66 which follows by two spaces any concurrent input signals on terminals 10 and 11.

The foregoing completes the description of the mode of operation of the invention, but there are several constructional details which should be mentioned. The positive potential on terminal 38 should be substantially equal to the potential induced in coil 22 by coil 24 to thus avoid any flow of current back into the inputs 10 and 11.

In connection with magnetic amplifier 17, 18, 19, 20, etc. it is noted that during the time intervals when the core is unsaturated, there will be a small flow of current through the coil which would normally tend to flow through rectifier 78 and resistor 79 thereby giving a small potential at the "carry" output. This small current, known as a "sneak" current, is the current necessary to produce the magnetizing force H corresponding to point 9 of Figure 4. Resistor 56 and rectifier 68 may be employed to eliminate the "sneak" current. The high negative potential at terminal 57 causes a current to flow in resistor 56 and diode 68 which is larger than said "sneak" current. When the sneak current flows it reduces the current in rectifier 68 but not to zero. Hence, the sneak current is effectively canceled. Therefore the potential on wire 69 will never be raised to a positive value due to the sneak current alone. It follows therefore that no current will flow through rectifiers 78, 83 and 84 during the intervals at which the core 17 is operating on its unsaturated portion. There would be sneak currents in connection with the amplifier 50, 51, 52, 65, etc. the same as previously described if it were not for parts 70, 71 and 72, which function in precisely the same manner as parts 57, 56 and 68 respectively. Hence, sneak currents are avoided in the case of the complemented amplifier A–C2 of Figures 2 and 3.

While normally in computing apparatus of the type here involved, the absence of an input pulse indicates "zero" in the binary system and the presence of an input pulse indicates a "one" digit, these conventions could be modified or reversed without departing from the spirit of the invention. For example, the apparatus could be rearranged whereby the absence of an input signal pulse, during a signal period, indicates a "one" digit and the presence of a pulse indicates "zero." As another example, the device could be revised so that a pulse on input terminal 10 indicates a "zero" digit and a pulse on input terminal 11 indicates a "one" digit. Those skilled in the art will readily see how the foregoing circuit could be revised to meet these and many other situations. It follows from the above discussion that the term "carry output" as used in the claims is broad enough to cover either the complemented or inverse output derived from wire 21, or the "carry" output 66. These outputs are examples of signals that are the reverse of each other. Likewise the circuit itself may be revised within the scope of the following claims without departing from the spirit of this invention. As an example of a circuit revision that could be made, it is noted that pulse generators 20 and 26 could be combined.

I claim to have invented:

1. A computing device comprising first and second inputs, means including a first pulse type magnetic amplifier for producing a pulse type signal during selected ones of regularly spaced output times in response to energization of either of said inputs during selected regularly spaced input times, means including a second pulse type magnetic amplifier for producing a pulse type signal during selected ones of said regularly spaced output times in response to the simultaneous energizations of both of said inputs during selected ones of said regularly spaced input times, means responsive to said two pulse type signals for producing a further signal that indicates whenever just one of said input is alone energized, and a third magnetic amplifier of the complementing type controlled by the output of said second amplifier for producing a carry output signal in response to a change in the output of the second amplifier which indicates simultaneous energization of said inputs.

2. A half-adder comprising means for generating a series of spaced power pulses, first and second inputs, means including a first magnetic amplifier coupled to said inputs for allowing said power pulses to pass therethrough if either of said inputs have a predetermined state, means including a second magnetic amplifier coupled to said inputs for blocking the flow of said power pulses therethrough in response to said predetermined state existing on both of said inputs, the amplifiers having output means on which the controlled power pulses appear, and means responsive to the pulses appearing at the output means of said amplifiers for producing sum and carry outputs.

3. A half-adder having two input terminals, a sum output terminal, means for producing a control signal which indicates whether or not a signal exists on either of said input terminals, gating means for producing a signal that indicates whether or not signals exist simultaneously on both of said input terminals, means for producing a train of regularly occuring pulses comprising a carry signal, means for interrupting said pulse train when the output of said gating means indicates that signals simultaneously exist on both of said input terminals, and additional gating means controlled by both said pulse train and said control signal for producing a sum output signal.

4. A computing device comprising a non-complementing magnetic amplifier having input and output means, said amplifier including means for producing an actuating signal in response to an input signal, two input terminals for respectively receiving the signals to be added, means for energizing the input of said amplifier whenever a signal appears on either of said terminals, means including a diode gate for producing a control signal when signals appear on both of said input terminals, a complementing magnetic amplifier having an input driven by said control signal and an output which produces a carry signal that is interrupted in response to receipt of a control signal, means including a diode gate controlled by said carry signal and also by the output of the non-complementing amplifier for producing a sum output signal only during those limited periods when the actuating signal and the carry signal exist simultaneously.

5. A computing device as defined in claim 4 having means responsive to said carry signal for producing an impulse for each carry digit.

6. A half-adder comprising means for producing a series of equally spaced power pulses, first and second input terminals, a first magnetic amplifier having a first input for receiving said power pulses, said amplifier having a second input and means for offering low impedance to the flow of the power pulse next following the appearance of a signal at said second input and otherwise blocking said power pulses, means responsive to a signal on either of said input terminals to energize the second input of said amplifier, means including a gate for producing a control signal in response to simultaneous energization of both said input terminals, means including a second magnetic amplifier having an input coupled to said gate, said second amplifier being operative to normally allow said power pulses to pass therethrough, said second amplifier being responsive to a control signal at its input for blocking the power pulse next following each one of the said control signals, means including a gate triggered by the outputs of both of said amplifiers for producing a sum output signal, and a carry output controlled by the second magnetic amplifier.

7. A half-adder comprising means for producing a first series of equally spaced power pulses, first and second input terminals for respectively receiving two signals to be added, a first magnetic amplifier having a first input connected to receive said power pulses, said amplifier having a second input and means for offering low impedance to the flow of the power pulse next following the appearance of a signal at said second input and otherwise blocking the power pulses of said first series, means responsive to energization of either of said input terminals to energize the second input of said amplifier, means including a diode gate for producing a control signal in response to simultaneous energizations of said input terminals, means including a second magnetic amplifier having its input coupled to said gate, said second amplifier being operative to normally allow said power pulses to pass therethrough, said second amplifier being responsive to said control signal to block passage of the power pulse next following each one of said control signals, means including a diode gate triggered by power pulses of said first series passing through the first amplifier as well as by those passing through the second amplifier for producing a sum output signal whenever both of the amplifiers simultaneously allow a power pulse to pass therethrough, means for producing a second series of spaced power pulses so synchronized with the first series of power pulses that pulses in one series occur during spaces in the other series, a carry output terminal, and means including a third magnetic amplifier controlled by the output of the second amplifier for allowing the pulses of the second series to pass therethrough to the carry output terminal whenever said second amplifier is blocking power pulses of said first series.

8. A computing device comprising a non-complementing amplifier having an input and an output, said amplifier including means for producing an actuating signal in response to an input signal, two input terminals for respectively receiving the signals to be added, means for energizing the input of said amplifier whenever a signal appears on either of said terminals, means including a gate for producing a control signal when signals appear on both of said input terminals, means including a complementing amplifier responsive to said control signal to produce a carry signal, a sum output line, a second gate coupling said sum output line to the output of said non-complementing amplifier, and means blocking said second gate responsive to said control signal.

9. A computing device comprising a non-complementing magnetic amplifier having an input and an output, said amplifier including means for producing an actuating signal in response to an input signal, two input terminals for respectively receiving the signals to be added, means for energizing the input of said amplifier whenever a signal appears on either of said terminals, means including a gate for producing a control signal when signals appear on both of said input terminals, a complementing magnetic amplifier coupled to the output of said gate and responsive to said control signal to produce a complemented carry signal, a sum output line, a second gate coupling said sum output line to the output of said non-complementing amplifier, the operation of said second gate being controlled by the output of said complementing amplifier.

10. The combination of claim 9 including a further complementing magnetic amplifier controlled by said complemented carry signal whereby said further complementing amplifier is operative to convert said complemented carry signal to a direct carry signal.

11. In combination, control means producing a train of regularly spaced pulses, a gating circuit, means coupling said pulse train to said gating circuit thereby to open said gating circuit during regularly spaced time intervals, first and second input signal sources, means coupling said sources to said gating circuit whereby an input signal from either of said sources effects an output signal at the output of said gating means during selected ones of said regularly spaced time intervals, and means responsive to the joint occurrence of signals from both said sources for inhibiting said control means thereby to interrupt said train of regularly spaced pulses so as to close said gate to signals from said input sources during other selected ones of said regularly spaced time intervals.

12. In combination, control means producing a train of regularly spaced pulses, first and second output terminals, a complementing magnetic amplifier having its input coupled to said control means and having its output coupled to said first output terminal whereby said complementing magnetic amplifier is regularly inhibited by said control means thereby to prevent the occurrence of pulses at said first output terminal, first and second signal sources, means responsive to a signal from one only of said sources for effecting an output signal at said second output terminal, and means responsive to joint occurrence of signals from both said sources for interrupting said train of regularly spaced pulses thereby to remove the inhibition from said complementing magnetic amplifier whereby said complementing magnetic amplifier is operative to effect an output signal at said first output terminal.

13. A half adder comprising first and second signal sources, a sum output terminal, a carry output terminal, signal responsive coupling means for coupling said signal sources to said sum output terminal, a first complementing magnetic amplifier having its output coupled to said signal responsive coupling means whereby the coupling of signals from either of said sources to said sum output terminal is controlled by the output state of said first complementing magnetic amplifier, said first complementing magnetic amplifier normally having a first predetermined output state, means responsive to joint occurrence of predetermined signals from both said signal sources for changing the output state of said first complementing magnetic amplifier from said first predetermined output state to a second predetermined output state, and a second complementing amplifier having its output coupled to said carry output terminal, said second amplifier including means responsive to said second output state of said first amplifier for producing a carry signal at said carry output terminal.

14. A half adder comprising first and second signal sources, a sum terminal, first means responsive to a signal from one only of said sources for producing a signal at said sum terminal, second means responsive to joint occurrence of signals from both said terminals for inhibiting a signal from being produced at said sum terminal, said first and second means including a signal responsive pulse type magnetic amplifier selectively producing an output train of regularly spaced control pulses, and a complementing magnetic amplifier for coupling the output of said first mentioned magnetic amplifier to a carry output terminal, whereby said complementing magnetic amplifier produces no output at said carry terminal when said first-mentioned amplifier is in an output producing state and said complementing magnetic amplifier produces an output at said carry terminal when said first-mentioned amplifier is in a non-output producing state.

15. A computing device comprising a source of regularly spaced pulses, first and second signal sources, first and second output terminals, means jointly responsive to said pulses from said pulse source and to a signal from either one of said signal sources for producing an output signal at said first terminal, means responsive to the occurrence of signals from both said signal sources for interrupting said regularly spaced pulses from said pulse source thereby to inhibit production of an output signal at said first terminal, and means responsive to said interruption of said regularly spaced pulses for producing an output signal at said second terminal.

16. In a logical device, the combination of a plurality of magnetic devices, each of said devices including a magnetic element, and winding means including an input portion and an output portion linked to said element, means for driving the winding means of a first one of said devices to produce an output signal in said output portion thereof when an input signal is applied to said input portion thereof, means for driving the winding means of a second one of said devices to produce an output signal in said output portion thereof only when no input signal is supplied to the input portion thereof, a plurality of sources of input signals, buffer means connecting said sources to said input portion of said first device, first gating means connecting said sources to said input portion of said second magnetic device so that an input signal is supplied to said second device only upon input signals from two of said sources being applied to said first gating means, and second gating means connected to said output portions of each of said first and second magnetic devices to produce an output signal only when an output signal is supplied by both of said first and second magnetic devices and, thereby, when one of said sources supplies an input signal but not when two of said sources supply input signals.

17. In a logical device, the combination of a plurality of magnetic devices, each of said devices including a magnetic element having two stable states, and separate winding means including an input portion and an output portion linked to each of said elements, pulse means for regularly driving said output winding portions of said devices at certain times so that the associated elements assume one of said stable states, means for regularly driving said output winding portion of a first one of said devices at times intermediate said certain times so that the associated element tends to assume the other one of said stable states, a plurality of input signal sources, buffer means connected between said input sources and said input portion of said first device so that input signals may be selectively applied thereto, said first device being operative to produce an output signal via its output portion in response to an input signal being applied to its input portion, first coincident gating means connected between said input sources and said input portion of said second device such that no input signal is applied to said second device in the absence of coincident input pulses being applied to said first gating means, said second device being operative to produce an output signal via its output portion when an input signal is not applied to its input portion, and second coincident gating means connected to receive said output signals from said output portions of said first and second magnetic devices to produce an output signal only when output signals are simultaneously produced by said first and second devices, said second gating circuit thereby being operative to produce an output signal when one of said input pulse sources applies an input signal and to produce no output signal when said input pulse sources apply coincident input signals.

18. In a logical device, the combination comprising first and second means for supplying input signals of two binary types representative of the binary digits "1" and "0," first and second magnetic devices, each of said devices including a magnetic element having two stable states, and separate winding means including an input portion and an output portion linked to each of said elements, pulse means for regularly driving said output winding portions of said devices at certain times so that the associated elements assume one of said stable states, means for regularly driving said output winding portion of said first one of said devices at intermediate times so that the associated element tends to assume the other one of said stable states, a first plurality of diodes for respectively receiving said input signals from said first and second signal supplying means, means connecting said first plurality of diodes in a logical cluster for supplying binary signals to said input-winding-portion of said first device in accordance with the logical combination of either one of said first and second binary signal means supplying one of said binary input signals representative of the digit "1," a second plurality of diodes for respectively receiving said input signals from said first and second signal supplying means, means connecting said second plurality of diodes in a logical cluster for supplying binary signals to said input-winding-portion of said second device in accordance with the logical combination of both of said first and second binary signal means supplying said binary input signals representative of the digit "1," said second device being of the complementary type and operative to produce at its output-winding-portion binary signals of the complement type to those received at its input-winding-portion, output means including a third plurality of diodes respectively connected to receive binary signals from said output-winding-portions of said first and second magnetic devices, and means for connecting said third plurality of diodes in a logical cluster for supplying binary output signals in accordance with the logical combination of both of said output-winding-portions supplying said binary signals representative of the digit "1," said binary output signals thereby being representative of the binary sum of binary digits represented by said binary input signals.

19. In a logical device, the combination comprising first and second means for supplying input signals of two binary types representative of the binary digits "1" and "0," a first binary magnetic amplifier means having input and output terminals, a first plurality of diodes for respectively receiving input signals from said first and second means, means connecting said first diodes in a logical cluster for supplying binary signals to said first amplifier input terminal in accordance with the logical combination of either of said first and second binary signal means supplying one of said binary input signals representative of the digit "1," a second binary magnetic amplifier means having input and output terminals, a second plurality of diodes for respectively receiving signals from said first and second means, means connecting said second diodes in a logical cluster for supplying binary signals to said second amplifier input terminal in accordance with the logical combination of both of said first and second binary means supplying said binary input signals representative of the digit "1," said second magnetic amplifier means being of the complementary type and operative to produce at its output terminal binary signals of the complement type to those received at its input terminal, output means including a third plurality of diodes respectively connected to receive binary signals from said first and second magnetic amplifier output terminals, and means connecting said third diodes in a logical cluster for supplying binary output signals in accordance with the logical combination of both of said amplifier output terminals supplying said binary signals representative of the digit "1," said binary signals thereby being representative of the binary sum of the binary digits represented by the binary input signals.

References Cited in the file of this patent

UNITED STATES PATENTS

| | | |
|---|---|---|
| 2,646,501 | Eckert | July 21, 1953 |
| 2,696,347 | Lo | Dec. 7, 1954 |
| 2,712,065 | Elbourn et al. | June 28, 1955 |

FOREIGN PATENTS

| | | |
|---|---|---|
| 701,851 | Great Britain | June 6, 1954 |

OTHER REFERENCES

High Speed Computing Devices, McGraw-Hill, 1950, pgs. 270–275.

Magnetic cores as elements of digital computing systems, by Haynes (pgs. 50–56 and title page ii), 1950.

Proc. of the IRE, "The Binac," by Auerbach et al., pages 19 and 20, January 1952.

Ramey, "The Single Core Magnetic Amplifier as a Computer Element," AIEE Transactions, part I, Communication and Electronics, January 1953, pages 443 and 444 relied on.

UNITED STATES PATENT OFFICE

CERTIFICATE OF CORRECTION

Patent No. 2,913,593 November 17, 1959

Henry William Kaufmann

It is hereby certified that error appears in the printed specification of the above numbered patent requiring correction and that the said Letters Patent should read as corrected below.

Column 5, line 68, for "output" read -- input --; column 7, line 61, for "input" read -- inputs --.

Signed and sealed this 20th day of September 1960.

(SEAL)
Attest:

KARL H. AXLINE
Attesting Officer

ROBERT C. WATSON
Commissioner of Patents